United States Patent [19]

Takahashi

[11] 4,012,460

[45] Mar. 15, 1977

[54] METHOD OF POLYMERIZING VINYL CHLORIDE WITH OLEFIN-ACRYLIC ESTER COPOLYMERS AND COMPOSITION THEREOF

[75] Inventor: Akio Takahashi, Amherst, N.Y.

[73] Assignee: Hooker Chemicals & Plastics Corporation, Niagara Falls, N.Y.

[22] Filed: Feb. 24, 1975

[21] Appl. No.: 552,682

Related U.S. Application Data

[63] Continuation-in-part of Ser. No. 251,100, May 8, 1972, abandoned.

[52] U.S. Cl. .................................... 260/878 R
[51] Int. Cl.² ................ C08F 265/04; C08L 33/08
[58] Field of Search ............................. 260/878 R

[56] References Cited

UNITED STATES PATENTS

| | | | |
|---|---|---|---|
| 3,544,660 | 12/1970 | Thomas et al. | 260/878 R |
| 3,557,253 | 1/1971 | Sugimoto et al. | 260/878 R |
| 3,607,980 | 9/1971 | Thomas | 260/878 R |
| 3,761,542 | 9/1973 | Kosaka et al. | 260/878 R |
| 3,888,948 | 6/1975 | Pinten et al. | 260/878 R |
| 3,891,723 | 6/1975 | Nicolet et al. | 260/884 |

FOREIGN PATENTS OR APPLICATIONS

| | | | |
|---|---|---|---|
| 743,641 | 9/1966 | Canada | 260/878 R |

OTHER PUBLICATIONS

Lenz, R. W., "Org. Chem. of Syn. High Polymers", Interscience, New York (1967) pp. 359–369.

Billmeyer, Jr. F.W., "Textbook of Polymer Sci.", Interscience, New York (1971) pp. 356–361, 420.
Thomas, J. C., "Two Step Bulk Polymerization of Vinyl Chloride", Soc. of Plastics Engineers, Ann. Tech. Conf. vol. XIII, Detroit, Mich. 5/15–18/67.
Thomas, J.C., "Two–Step Bulk Polymerization of Vinyl Chloride", SPE Journal, Oct. 1967.

*Primary Examiner*—Alan Holler
*Attorney, Agent, or Firm*—Peter F. Casella; James F. Mudd; David A. Stein

[57] ABSTRACT

An improved polyvinyl chloride or polyvinyl chloride copolymer containing up to 50 percent of a monomer can be obtained by graft polymerizing in contact with an olefin-acrylic ester copolymer in a process of bulk polymerization comprising single stage or two-stage polymerization wherein high speed agitation is used during the first stage and low speed agitation is used in the second stage. By polymerizing in the presence of an olefin-acrylic ester copolymer, reduced particle size, easy processability, lower melt viscosity and improved impact strength can be obtained in the resin product. Two stage bulk polymerization in contact with small amounts of the olefin-acrylic ester copolymer is effective in providing reduced particle size. Larger amounts of olefin-acrylic ester copolymer can be used in either a two-stage or single stage polymerization process where high impact strength, reduced melt viscosity, improved clarity and easy processability properties are desired in the final product.

13 Claims, No Drawings

METHOD OF POLYMERIZING VINYL CHLORIDE WITH OLEFIN-ACRYLIC ESTER COPOLYMERS AND COMPOSITION THEREOF

REFERENCE TO PRIOR APPLICATION This is a continuation in part of copending application Ser. No. 251,100, filed May 8, 1972, now abandoned.

BACKGROUND OF THE INVENTION

1. Field of the Invention

This invention relates to the preparation of homopolymers and copolymers of vinyl halide such as vinyl chloride having reduced grain size and melt viscosity, improved impact strength and easy processabiltiy. processability. polymers are useful in the production of films, coatings, and molded articles. Scale build-up is eliminated during bulk polymerization of the polymers of the invention.

The polymers of the invention have impact strength improved by as much as a factor of 10 over the unmodified prior art polymers. Additionally, the polymers of the invention have improved clarity and can be more easily processed to produce molded articles, since the polymers of the invention have excellent mold release properties allowing molds to be made using the polymer of the invention without the usual additional lubricant components of the use of mold release agents which are used on the mold itself in order to provide a surface to which the polymer will not stick readily.

Fine grain homopolymers and copolymers obtained by the process of the invention have narrow grain size distribution and 10 to 50 micron average grain size range, thus permitting the polymers of the invention to be used in applications where previously bulk polymerized polymers were unsuited because of their excessive grain size and wide grain size distribution. In prior art bulk polymerization methods, polymers are produced having average grain sizes in the range of about 80 to about 150 microns. More costly suspension polymerization processes are presently utilized to produce fine grain size polymers. The normal suspension processes produce grain sizes in the range of 100 to 200 microns.

The polymers of the invention have the further advantage that they are not contaminated with the suspending agents of suspension produced polymers.

2. Description of the Prior Art

Polyvinyl chloride has been produced by bulk or mass polymerization methods in the absence of solvents and diluents. The polymer produced has an irregular shape which may vary from minute globular particles to irregular, non-gobular masses. In British Pat. No. 1,047,489 and U.S. Pat. No. 3,522,227, both of which are hereby incorporated by reference, there are described a method of polymerization in mass in two steps which produces an improvement in regularity of granular size and shape. The process is more controllable and the product more uniform than can be obtained by other methods of bulk polymerization. In this process, the monomer is polymerized in a first stage to about 7 to about 15 percent conversion, preferably about 8 to about 10 percent conversion in a reactor in which provision is made for high speed, high shear agitation. At the end of the first stage polymerization, the mass is transferred to a second reactor and further polymerized using slow speed agitation to an appropriate end point (70 to 85 percent conversion in many cases). It is an object of this invention to produce polymers having small particle size which remain substantially unsolvated when placed in contact with primary type plasticizers for vinyl chloride resins.

Vinyl halide polymers of the prior art have been prepared in a wide variety of molecular weights; those of high molecular weight generally having better physical properties such as hardness and strength than those of lower molecular weight. The higher the molecular weight, however, the more difficult it is to process the polymer into a final product form.

In the subsequent processing of vinyl halide polymers, such as milling and extruding, higher molecular weight polymers require the use of higher shear force and/or higher temperatures to fluidize the polymer in comparison to lower molecular weight materials. The increased shear force and/or increased temperature required increases the internal temperature of the polymer and tends to degrade the vinyl halide polymers. In addition, the increased shear force necessary to process the polymers adds to the cost of processing the polymer. It is an object of this invention to produce easy processing polymers having improved clarity, greater fluidity at elevated temperatures reduced resistance to shear force without sacrificing other physical properties, greater stability against degradation on milling and molding and excellent mold release properties. Conventional lubricants and mold releasing agents such as polyethylene wax, silicone resin, fluorinated resins, etc., which are added to resins of the prior art to molding, can be eliminated when the polymers of the invention are used.

Mechanical blends of olefin polymers and polyvinyl chloride have been prepared in an effort to produce easy processing polyvinyl halide polymers. The mixtures are incompatible and unsatisfactory. Graft copolymers of polyethylene and vinyl chloride have been prepared as described in Belgian Pat. Nos. 657,762 and 652,069 using methods of suspension polymerization in an effort to increase the flexibility at low temperatures of polyvinyl halide polymers and copolymers as well as improve their impact resistance. These graft copolymers overcome the incompatibility of physical blends of polyolefins and polyvinyl chloride but these methods of producing graft copolymers are expensive and time consuming. It is an object of the present invention to produce graft copolymers by the bulk polymerization of an olefin-acrylic ester copolymer dissolved in a vinyl chloride monomer. The process of the invention provides graft copolymers having unexpectedly large improvements in impact resistance for the amount of olefin-acrylic ester copolymer used.

French Pat. No. 1,588,381 discloses a process for the single stage bulk polymerization of vinyl chloride in combination with an auxiliary polymer such as styrene-butyl acrylate-acrylic acid terpolymer to overcome the tendency toward the formation of curds and deposits on polymerization equipment which requires thereafter complicated cleaning operations. It is an object of the present invention to produce a high impact strength, improved processing, small particle size vinyl halide polymers by a two-stage bulk polymerization process in which vinyl chloride is graft polymerized with an olefin-acrylic ester copolymer.

U.S. Pat. No. 3,261,788 discloses that stable dispersions of synthetic polymers in an inert organic liquid can be made without using conventional stabilizing agents. Instead, stabilizing solvatable groups are used which become indirectly attached to the dispersed polymer particles through groups which themselves are merely adsorbed onto the surface of the dispersed particles. The term "solvatable group" means that the group is solvated by the inert organic liquid in which the polymer is dispersed. An example of a polymerization system having a solvatable group incorporated into the dispersed particle is a system wherein the polymer precipitates out of an inert organic liquid in the presence of a block or graft copolymer, of which one constituent is solvated by the inert organic liquid and the other constituent is compatible with and is coprecipitated with the polymer. The coprecipitation results in the compatible constituent becoming inextricably entangled with the precipitated polymer chains and hence becoming an integral part of the particle. The block or graft copolymer may be added as such or may be formed in situ during the formation of the polymer to be dispersed.

SUMMARY OF THE INVENTION

This invention relates to a method of obtaining a small particle size vinyl halide homopolymer or copolymer such as polyvinyl chloride by a graft polymerization process involving a two-stage bulk polymerization using high speed, high shear agitation during a first stage and low speed, low shear agitation during the second stage. During the first stage polymerization, the monomer or monomers are present in contact with an olefin-acrylic ester copolymer which is soluble or partially soluble in the monomer or monomers under conditions of normal room temperature and normal pressure. A reduction in particle size of the polymerized product can thus be obtained, in which the average grain size is in the range of 10 to 50 mircrons.

In another aspect of this invention, a method is provided for obtaining an impact resistant easy processing vinyl halide homopolymer or copolymer having improved clarity without sacrificing other physical properties by a single stage or two-stage bulk polymerization of a vinyl halide monomer or comonomers in contact with an olefin-acrylic ester copolymer which is soluble or partially soluble under normal conditions of room temperature and pressure in the monomer or comonomers used. An unexpected improvement in impact strength can be obtained by the bulk polymerization methods disclosed herein as compared to suspension processes known in the prior art.

The graft polymers of the invention have been found to possess both excellent mold release properties and easy processability as the result of the chemically combined olefin-acrylic ester copolymer. Thus, it has been found that conventional mold release agents either applied to the mold itself or incorporated into the polymeric compound to be molded can be eliminated.

DESCRIPTION OF THE PREFERRED EMBODIMENTS

The present invention in one aspect is directed to a process for preparing small particle size vinyl halide polymers by a two-stage bulk polymerization process by the polymerization of a monomer composition comprising at least 80 percent vinyl halide in the presence of from 0.1 percent to about 6 percent by weight, preferably about 0.5 percent to about 4 percent, of an olefin-acrylic ester copolymer based upon the total weight of monomer. The olefin-acrylic ester polymer which is soluble or partially soluble in the monomer composition is derived from an olefin monomer comprising monomers having 2 to 8 carbon atoms and acrylic ester monomers, comprising the esters of acrylic acid and methacrylic acid wherein the alcohol portion of the ester has 1 to about 18 carbon atoms. The following acrylic esters are suitable as monomers: methyl acrylate, ethyl acrylate, propyl acrylate, butyl acrylate, methyl methacrylate, ethyl methacrylate, propyl methacrylate butyl methacrylate. The following olefin monomers are suitable for copolymerization with the acrylic ester: ethene, propene, butene-1, isobutene, pentene, hexene, heptene, octene, 2-methylpropene-1, 3-methylbutene-1,4-methylpentene-1, 4-methylhexene-1, 5-methylhexane-1.

The olefin-acrylic copolymers employed in the practice of the invention as exemplified by an ethylene-ethyl acrylate copolymer have an ethyl acrylate content of about 15 to about 95 percent by weight and an ethylene content of about 95 to about 15 percent by weight of the total weight of the copolymer, preferably about 15 to about 75 percent by weight of ethyl acrylate and about 85 to about 25 percent by weight of ethylene on the total weight of the copolymer. The copolymers have weight average molecular weights of 15,000 to 500,000, preferably from about 30,000 to about 200,000. The copolymers used are characterized by being soluble or partially soluble at normal room temperature and pressure in vinyl chloride monomer. To facilitate solution of the olefin-acrylic ester copolymer temperatures of from 30° to about 60° C are used. In addition, nitrogen pressure of about 1 to 2 atmospheres is used during the polymerization. The vapor pressure of vinyl chloride in the reactor during polymerization is significantly reduced by the dissolved olefin-acrylic ester copolymer. The additional nitrogen pressure used increases the total pressure only a small amount as compared to a polymerization conducted without the use of the dissolved copolymer. In this way, the increased pressure serves to prevent deposition of the copolymer on the reactor wall.

In another aspect, the invention is directed to a process for preparing vinyl halide polymers having improved impact resistance and easy processability as indicated by reduced melt viscosity at equal molecular weight without sacrificing other physical properties. More particularly, the present invention relates to vinyl halide polymers prepared by polymerizing a monomer composition comprising at least 80 percent of a vinyl halide in the presence of from about 4 percent to about 20 percent preferably about 6 percent to about 15 percent by weight of an olefin-acrylic copolymer. The proportion of copolymer is based upon the total weight of the monomer used. Improved impact strength, easy processing vinyl halide polymers can be prepared in a single stage, bulk polymerization process with low shear agitation or in a two-stage bulk polymerization process in which high speed, high shear agitation is used during a first stage, and low speed, low shear agitation is used in a second stage.

The physical properties of the graft polymerization reaction product such as graft polymerized vinyl chloride is greatly influenced by the degree of interphase compatibilization. By this is meant the phase distribution of the rigid or brittle homopolymer or copolymer continuous phase and the tough rubbery disperse phase of the trunk polymer. During the two-stage bulk polymerization of this invention, the compatibilization or phase distribution takes place so that the physical properties of the product obtained by the above polymerization process are fixed and do not change substantially during further processing. The reaction product exhibits unexpectedly high impact strength for the amount of olefin-ethyl acrylate rubber copolymers used in the graft copolymerization. Good thermal properties and high gloss when fabricated into films and molded objects also characterize the product of the invention.

According to studies made using the scanning electron microscope, the two-stage bulk graft copolymerization process of the invention provides a product having 10 to 50 micron particle size in which the rubber or graft copolymer disperse phase has about 0.1 to about 0.5 micron particle diameter. A graft polymer produced by a suspension process is rather poor in physical properties since, as is well known, the reaction takes place in a large suspension droplet resulting in a product with 80 to 150 microns particle size in which the rubber disperse phase has 1 to 10 microns particle diameter. Graft polymers made using the suspension process have poor physical properties such as excessive shrinkage, poor gloss and flexibility at high temperature as a result of the residual strain in the molded product resulting from poor interphase compatibilization or phase distribution.

It is the object of the single stage or two stage bulk polymerization process of the invention to employ a reactive vinyl monomer or mixture of monomers such as vinyl chloride and an olefin-acrylic ester copolymer dissolved in the vinyl chloride monomer which upon reaction forms a graft copolymer with the vinyl chloride monomer. The graft copolymer so formed acts to stabilize a portion of the vinyl chloride polymer which constitutes the disperse phase which is present and surrounded by the vinyl chloride monomer continuous phase during the initial stage of reaction. The product obtained is a fine powder. Thus, it is believed that by the use of this novel stabilization mechanism during the initial stage of the two-stage bulk polymerization process of the invention, improved physical properties are obtained in the graft polymers so formed which have superior properties in comparison with the graft polymers obtained by suspension polymerization processes.

While not desiring to be bound by theory, it appears that in the bulk polymerization processes of the invention, graft copolymerization takes place in a non-aqueous emulsion droplet. Prior to reaction, the system containing vinyl chloride, trunk olefin-acrylic copolymer and free radical catalyst is a clear solution. As soon as the reaction system is warmed up to initiate the reaction, the system becomes a milky emulsion. The similar appearance to that of a normal aqueous emulsion polymerization system persists during about an hour of the reaction period, and then the system becomes a thick paste. The thick paste subsequently becomes a fine non-viscous powder at about 40 percent conversion of monomer. The polyvinyl chloride initially formed is surrounded by a shell of polyvinyl chloride/olefin-acrylic graft copolymer.

The olefin portion of the olefin-acrylic ester copolymer backbone of the graft copolymers of the invention is believed to function to reduce the melt viscosity of the vinyl halide graft polymer formed by affecting the polymer formed much like an external incompatible processing oil. The acrylic ester copolymer portion of the graft copolymer of the invention is believed to function to improve the clarity of the polymer formed since the acrylic ester is quite soluble in the vinyl halide polymer and the refractive index of the acrylic ester is very close to that of the vinyl halide.

The melt viscosity of the graft copolymer formed also depends upon the molecular weight of the trunk polymer, as well as the vinyl halide polymer formed thereon. A maximum reduction of melt viscosity can be expected from the graft copolymer where the trunk polymer is chosen so as to have low molecular weight and the vinyl halide monomer is polymerized so as to have a reasonably low molecular weight also. An ethylene-ethylacrylate copolymer having low molecular weight in the range of 50,000 to 150,000 has been found effective to produce easy processing graft copolymers.

Suitable vinyl halide monomers useful in the invention are alpha-halo-substituted ethylenically unsaturated compounds which are capable of entering into an addition polymerization reaction, for example, vinyl flouride, vinyl chloride, vinyl bromide, vinyl iodide, vinylidene fluoride,, vinylidene chloride, vinylidene bromide, vinylidene iodide and the like, although vinyl chloride is preferred. The polymers of the present invention can be formed of the same or different alpha-halo-substituted ethylenically unsaturated materials and, thus, the invention includes homopolymers, copolymers, terpolymers, and interpolymers formed by addition polymerization. Illustrative of these copolymers is a copolymer of vinyl chloride and vinylidene chloride.

While it is preferred that the monomer composition be comprised totally of vinyl halide monomer as described above, the present invention is also intended to include copolymers formed by the free-radical addition polymerization of a monomer composition containing a predominant amount., e.g., at least 50 percent of vinyl halide and a minor amount, e.g., up to 50 percent by weight of another ethylenically unsaturated monomer composition copolymerizable therewith. Preferably, the other ethylenically unsaturated monomer is used in amounts of less than 25 percent by weight and more preferably in amounts less than 10 percent by weight of the total monomer used in preparing the polymer. Suitable ethylenically unsaturated compounds which can be used to form copolymers, terpolymers, interpolymers and the like, are illustrated by the following monoolefinic hydrocarbons, i.e., monomers containing only carbon and hydrogen, including such materials as ethylene propylene, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives, e.g., o-, m- or p-methyl, ethyl, propyl or butyl styrene; alphamethyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobanzoates, alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids., e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, and ethyl alpha-chloroacrylate, methyl alpha-chloroacrylate, and ethyl alpha-chloroacrylate, methyl alpha-bromoacrylate ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and alkyl alpha-cyanoacrylates, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutactonate; monoolefinically unsaturated organic nitriles including, for example, fumaronitrile, acrylonitrile, methacrylonitrile, ethacrylonitrile, 1,1-dicyanopropene-1,3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride, and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like, can also be included, as can diolefinically unsaturated hydrocarbons containing two olefinic groups in conjugated relation and the halogen derivatives thereof, e.g., butadiene-1,3; 2-methyl-butadiene-1,3; 2,3-dimethylbutadiene-1,3; 2-methyl-butadiene-1,3; 2,3-dimethyl-butadiene-1,3; 2-methyl-butadiene-1,3; 2,3-dichloro-butadiene-1,3; and 2-bromo-butadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride, vinyl chloride and vinyl alkyl ether. These are given as illustrative of the numerous combinations of monomers possible for the formation of copolymers. The present invention includes all such combinations.

The free radical bulk polymerization of the monomer composition is conducted in the presence of an olefin-acrylic ester.

The free radical bulk polymerization can take place in accordance with the process of the invention at temperatures between 25° and 90° C. The polymerization reaction is conducted in the presence of a free radical initiator. Useful free-radical iniators are organic or inorganic peroxides, persulfates, ozonides, hydroperoxides, peracids and percarbonates, azo compounds, diazonium salts, diazotates, peroxysulfonates, trialkyl boraneoxygen systems, and amine oxides. Azobisisobutyronitrile is particularly useful in the present invention. The catalyst is used in concentrations ranging from about 0.01 to about 1.0 percent by weight based on the total weight of the monomers. For use in bulk polymerization, the catalysts which are soluble in the organic phase, such as benzoyl peroxide, diacetyl peroxide, azobisisobutyronitrile or diisopropyl peroxydicarbonate, azobis (alphamethyl-gamma-carboxybutyronitrile), caprylyl peroxide, lauroyl peroxide, azobisisobutyramidine hydrochloride, t-butyl peroxypivalate, 2,4-dichlorobenzoyl peroxide, azobis (alpha, gamma-dimethylvaleronitrile), and 2,2'-azobis (2,4-dimethyl valeronitrile) are generally used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking.

The polymerization products of the present invention can be admixed with various conventional inert additives, such as fillers, dyes, and pigments. In addition, the polymerization products can be admixed with plasticizers, lubricants, thermostabilizers and ultraviolet light stabilizers as desired.

All other conditions and measures of the method of the invention are those conventionally employed in the previously known methods for the bulk polymerization of vinyl chloride involving two stage polymerization as disclosed in British Pat. No. 1,047,489 and U.S. Pat. No. 3,522,227. In the following abbreviated description of the process, for the sake of simplicity, the initial stage of the polymerization or copolymerization will be referred to as first stage reaction and the vessel in which this initial stage of polymerization is carried out will be referred to as "Prepolymerizer". The final or complementary stage of the polymerization will be called simply second stage reaction and the vessel in which it is carried out the Polymerizer.

In the first stage reactor, the means chosen to agitate the monomer or monomers is of a type capable of providing high shear and is commonly referred to as a "radial turbine type" agitator. At the start of the first stage reaction, the Prepolymerizer is charged with a monomer composition to which a catalyst has been added. Any polymerization catalyst generally used in bulk polymerization methods, that is those hereinabove described can be used to an extent which is usual for bulk polymerization processes. After addition of the vinyl chloride monomer to the first stage reactor, a small amount of monomer is vented in the process of removing the air from the first stage reactor vessel. The speed of the turbine type agitator generally lies between 500 and 2,000 revolutions per minute or a tip speed of about 2 to 7 meters per second in the first stage reactor. A tip speed of about 0.5 to about 2 meters per second is used in the second stage reactor. These figures should not be regarded as limiting values. As soon as a conversion of at least about 3 to about 20 percent of the monomer composition has been obtained in the first stage reactor, the contents of the vessel are transferred to a second stage polymerizer vessel equipped to provide slow speed, low shear agitation so as to insure proper temperature control of the reaction medium.

The reaction temperature in both first and second stage reactors generally ranges between about 25° C to about 90° C, preferably about 40 to about 80° C. The reaction pressure in the first stage reactor generally ranges between about 130 pounds per square inch to about 210 pounds per square inch, preferably about 150 to about 190 pounds per square inch. The reaction pressure in the second stage reactor generally ranges between about 80 to about 210 pounds per square inch, preferably between about 90 to about 190 pounds per square inch. In single stage bulk polymerization, the reactor used and reaction conditions are the same as those employed in the second stage of the two-stage polymerization process hereinbefore described.

The optical microscope and sieve analysis were used as a method of determining average particle size. A magnification of 155 times was used together with an eye piece having a scale graduated in microns to determine the average particle size directly in microns.

The molecular weight of the polymers of the invention is comparable to that of polymers presently commercially produced by bulk polymerization which ranges from about 40,000 to about 125,000 by the weight average method. To determine molecular weight, relative solution viscosity, RSV, was measured in tetrahydrofuran at 25 degrees centigrade using a 1 percent resin solution. This is a slight modification from ASTM 1243A wherein a 1 percent resin solution in cyclohexanone is used. The polymers produced varied by this method between 1.6 and 2.7. Other test methods are described below.

A falling dart impact has been determined for polyvinyl chloride and related compositions using a falling dart apparatus manufactured by Gardner Laboratory, Inc., Bethesda, Md. The apparatus consists of a 4-pound weight or dart with a rounded end of ½ inch diameter. The dart is allowed to fall through a guiding cylinder and to strike a sample which is held on a flat surface over a ⅝ inch diameter which is ¼ inch deep. The guiding cylinder is calibrated in inches, the impact transmitted to the sample being dependent on the height of the fall of the dart. The height of fall in feet times the dart weight (4 pounds) given an impact in ft.-lb units.

The sample for the test must be at least ½ inch wide but preferably 1 inch or wider. A thickness of one eighth inch is desirable. The dart is allowed to fall on a sample from a given height. If the sample survives the impact without showing signs of breaking, cutting or cracking (it may stretch or distort) it is recorded as passing that impact. Higher falls of the darts are carried out until a failure is recorded. The impact strength is given as the highest pass. This apparatus measures impact strength up to 14 ft.-lb. Samples were prepared for testing by mixing a polymer with 3 parts per hundred grams polymer of a tin stabilizer sold under the trademark "Thermolite T-31" and compression molding a one eighth inch thickness sheet at 400° F.

Heat distortion temperature was measured by ASTM D-648 at 264 psi.

The melt viscosity was measured at 400° F. 63 rpm using the Brabender Plasticorder. Fifty-five grams of sample containing 2 parts per hundred grams resin of a tin stabilizer sold under the trademark Thermolite T-31 were charged into the Brabender chamber which was kept at 400° F/63 rpm. After reaching the fusion point, the sample reaches an equilibrium torque. The equilibrium torque expressed in meter-grams (m-g) corresponds to the melt viscosity.

In order to further illustrate this invention but without being limited thereto, the following examples are given. In this specification and claims, all parts and percentages are be weight, all pressures are gauge pressures, and all temperatures are in degrees centigrade unless otherwise specified.

EXAMPLE 1

In a vertical type first stage reactor of stainless steel construction equipped with a radial turbine type agitator were added 9.0 grams of an ethylene-ethylacrylate copolymer of 89,300 weight average molecular weight. The ethylene-ethylacrylate copolymer having an ethylene/ethylacrylate ratio of 82/18. Next, were added 350 grams of vinyl chloride monomer and the mixture heated to 70° C. for one-half hour in order to dissolve the copolymer in the vinyl chloride monomer. Once solution is complete, the mixture is cooled to 30° C and 100 milliliters of vinyl chloride added, together with 0.1 milliliter of a 29 percent solution of acetyl cyclohexane sulfonyl peroxide in dimethyl phthalate, sold under the trademark "Lupersol 228P", and 0.25 milliliter of a 40 percent solution of di-2-ethyl hexyl peroxy dicarbonate in mineral spirits, sold under the trademark "Lupersol 223M". The mixuture was polymerized at 70° C for a period of 30 minutes while agitating using a radial turbine type agitator operated at a speed of 2,000 revolutions per minute.

The mixture was then transferred to a glass reaction vessel containing an additional 250 grams of vinyl chloride monomer, 0.2 milliliter of Lupersol 228P, and 0.5 milliliter of Lupersol 223M. The mixture was heated to a jacket temperature of 65° C and maintained at this temperature over a period of 5 hours and 47 minutes. After this time, unreacted monomer was vented to the atmosphere and the dry polymer composition passed through screening equipment. In this way, 402.3 grams of a powdery polymer is obtained in a yield of 57 percent by weight based upon the weight of the monomer available for polymerization. The powdery polymer has an average particle size of 25 microns by photomicroscope.

EXAMPLE 2 — Control

For purposes of comparison only, a polyvinyl chloride homopolymer was prepared using identical proportions and conditions as described above, with the exception of the omission of the ethylene ethylacrylate copolymer. The polymer obtained in 63 percent yield had an average particle size of 105 microns as judged by the fact that 50 percent of the polymer produced passed through a 105 micron screen. Less than 1 percent of the polymer passes through a 44 micron (325 mesh) screen. The total product contained 5 percent lump. The product had a glass transition temperature of 75° C, a heat distortion temperature of 66° C, and a notched Izod and falling dart impact strength in foot pound per inch of 0.8.

EXAMPLE 3

A bulk polymerized polyvinyl chloride graft copolymer was made by the process of this invention using the same equipment and procedure of Example 1, except that 40 grams of the same ethylene/ethylacrylate copolymer were dissolved in 350 grams of vinyl chloride monomer at 75° C over a period of 30 minutes. After cooling down the mixture to 30° C, 120 grams of vinyl chloride monomer were added, together with 0.1 milliliter of a 29 percent solution of acetyl cyclohexane sulfonyl peroxide in dimethyl phthalate, sold under the trademark Lupersol 228P, and 0.25 milliliter of a 40 percent solution of di-2-ethyl hexyl peroxy dicarbonate in mineral spirits, sold under the trademark "Lupersol 223M". Twenty grams of vinyl chloride monomer were vented to the atmosphere in order to remove air from the reactor. The mixture was polymerized for 30 minutes at 75° C, and then the mixture was transferred to a 5-gallon stainless steel, second stage reaction vessel containing 300 grams of vinyl chloride monomer, 0.5 grams of lauroyl peroxide. Fifty grams of vinyl chloride monomer were vented to the atmosphere and the mixture polymerized under 1 atmosphere of nitrogen for a period of 5 hours at a jacket temperature of 75° C. A total of 585 grams of polymer was obtained after unreacted monomer was vented to the atmosphere. A powdery polymer is obtained in a yield of 79 percent by weight based upon the weight of the monomer available for polymerization. The product had an impact strength as measured by the falling dart method of greater than 14. Chlorine analysis showed that 6.7 percent of the polymer was ethylene-ethylacrylate.

EXAMPLE 4

A single stage bulk polymerized polyvinyl chloride graft copolymer was made using the second stage polymerization apparatus of Example 1 as follows. Twenty-five grams of an ethylene-ethylacrylate copolymer was dissolved in 435 grams of vinyl chloride monomer, together with 0.03 milliliter of a 29 percent solution of acetyl cyclohexane sulfonyl peroxide in dimethyl phthalate, sold under the trademark Lupersol 228P, and 0.37 milliliter of tertiary butyl peroxy pivalate, 75 percent in mineral spirits, sold under the trademark "Lupersol 11". The copolymer was dissolved in the vinyl chloride monomer under a pressure of 1 atmosphere of nitrogen at 68° C. After solution was effected, the mixture was cooled to about 30° C and the rest of the materials were added. The temperature of the jacket was slowly raised to a temperature of 75° C and polymerization continued over a period of 5 hours. The batch was then cooled down and 300 milliliters of methyl alcohol containing 0.5 grams of tertiary butyl paracresol, sold under the trade mark "Parabor 441", was added as an antioxidant. A Powdery polymer was obtained in a yield of 73 percent by weight based upon the weight of the monomer available for polymerization. A total of 337.9 grams of polymer were obtained which had a falling dart impact strength of 12 foot pounds.

EXAMPLE 5 — Control

To a polyvinyl chloride homopolymer, sold under the trademark of "Rucon B22-1", were added an ethylene-ethylacrylate copolymer in granular form prepared by first dissolving 25 grams of the copolymer in 200 milliliters of warm benzene and then precipitating the polymer from the solution by slowly adding isopropyl alcohol to the solution. The precipitate was filtered, washed with isopopyl alcohol, and then dried at 50° C in vacuum. The mixture was made by combining in a Waring blender 180 grams of the polyvinyl chloride homopolymer with 20 grams of the granular copolymer obtained by the above procedure. When the temperature reached 60° C, 6 grams of a tin stabilizer was added. This is sold under the trade mark "ThermoliteT-31". Blending continued for 3 minutes. The mixture was extruded at 400° F and compression molded so as obtain specimens 5 inches × 5 inches × ⅛ inch. Evaluation of the impact strength by the Falling Dart method indicates a value of 4.0 foot pounds for the mixed composition. A 5 mil thickness sheet produced using the mixture of this example was hazy in appearance.

EXAMPLE 6

Using the same procedure as in Example 4, a bulk polymerized polyvinyl chloride graft copolymer was made by a single stage bulk polymerization process by dissolving 20 grams of an ethylene-ethylacrylate copolymer of 46,000 weight average molecular weight in 350 grams of vinyl chloride monomer. The mixture was cooled down to about 30° C and an additional 130 grams of vinyl chloride monomer were added, together with 0.03 milliliters of a 29 percent solution of acetyl cyclohexane sulfonyl peroxide in dimethyl phthalate, sold under the trademark Lupersol 228P, and 0.375 milliliters of Lupersol 11. The polymerization was conducted at 65° C over a period of 5 hours, and yielded 367 grams of product. A conversion of 73 percent was obtained with 5.8 percent of ethylene-ethylacrylate copolymer contained by chlorine analysis, the polymer having a relative solution viscosity of 2.1 and a melt viscosity as determined by using the Brabender Plasticorder of 1350. This compares with a melt viscosity of 1500 for a polyvinyl chloride homopolymer of similar relative solution viscosity and, corresponds to a 10 percent reduction in melt viscosity as compared to the polyvinyl chloride homopolymer. The polyvinyl chloride graft copolymer was found by a fractionation procedure using dimethyl formamide and n-heptane to contain 2.4 percent free ethylene-acrylic ester copolymer and 7.3 percent graft copolymer consisting of 3.4 percent ethylene-acrylic ester trunk polymer and 3.9 percent grafted polyvinyl chloride.

EXAMPLE 7

Following the procedure and proportions of Example 4, a bulk polymerized polyvinyl chloride graft copolymer was made having a copolymer content of 7.4 percent, a melt viscosity of 775 as measured by the Brabender Plasticorder and a relative solution viscosity of 1.9. In comparison with a polyvinyl chloride homopolymer of similar relative solution viscosity, having a melt viscosity of 980 as measured on the Brabender Plasticorder, the graft copolymer showed a 21 percent reduction in melt viscosity. A 5 mil thickness sheet made from the polymer of this Example was a clear film.

EXAMPLE 8

A graft copolymer was made in accordance with the bulk polymerization process of the invention as follows. 25 grams of an ethylene-methylacrylate copolymer composed of 15–25% methylacrylate and designated Poly Eth by the Gulf Company, were dissolved in 400 milliliters of vinyl chloride by heating for 1 hour at 70° C. The solution was transferred to a reaction vessel, mixed with 100 milliliters of vinyl chloride, 0.4 milliliter of a 75% solution of tertiary-butyl perpivalate in mineral spirits sold under the tradename Lupersol 11 and 0.1 milliliter of a 28% solution of acetyl cyclohexane sulfonyl peroxide in dimethyl phthalate designated "228P". The reaction mixture was polymerized for 4 hours at 70°–75° C. During each heating period an additional 50 milliliters of vinyl chloride was purged through the system, 100 parts of the resulting polymer were blended with 2 parts tin stabilizer designated T-31 by the Metal & Thermit Company, and 2 parts of an acrylate type processing aid designated K-175 by Rohm & Haas Company, and milled for 6 minutes at 360° F. The milled produce was compression molded at 380° F in 6 inch by 6 inch plaques. The plaques were translucent and white in color.

EXAMPLE 9 — Control

A polymer was prepared by a suspension polymerization process as follows. 20 grams of the ethylene-methylacrylate copolymer of Example 8 were dissolved in 300 milliliters of vinyl choride by heating for one hour at 70° C. The solution was transferred to a reaction vessel where it was mixed with 700 milliliters water, 100 milliliters vinyl chloride, a suspension system comprised of 0.5 gram Dupanol Me surfactant and 50 milliliters of Methocel methyl cellulose, 0.35 milliliters Lupersol 11 and 0.08 milliliter of 228P. The reaction mixture was polymerized for 4 hours at 70° C. 100 parts of the resulting polymer were blended with 2 parts of T-31 tin stabilizer and 2 parts of K-175 processing aid and milled for 6 minutes at 360° F. Discoloration of the polymer was observed during milling. The milled product was compression molded at 380° F in 6 inch by 6 inch plaques. The molded plaques were translucent and dark grey in color.

Various modifications can be made in the invention without departing from the spirit thereof. Therefore, the foregoing specification is intended to illustrate the invention but not to limit it.

What is claimed is:

1. In a process for the preparation of a polymer of a vinyl halide by a twostage bulk polymerization of a vinyl halide monomer wherein polymerization is carried out in a first stage, during which a reaction mixture is subjected to high speed agitation until about 3 percent to about 15 percent of said monomer have been converted to polymer, and in which said polymerization is completed in a second stage, during which said reaction mixture is subjected to low speed agitation until the reaction has been completed, the improvement comprising polymerizing said vinyl halide in the presence of 0.1 to about 6 percent by weight of a trunk polymer consisting essentially of an aliphatic olefinic-acrylic ester copolymer, based upon the weight of said monomer to produce a polymer having a graft copolymer disperse phase of about 0.1 to about 0.5 micron particle diameter and having a particle size of 10 to 50 microns average grain size.

2. The product of the process of Claim 1.

3. A process according to claim 1 wherein said copolymer has an olefin content of about 10 to about 90 percent by weight of said copolymer and an acrylic ester content of about 90 to about 10 percent by weight of the total weight of the copolymer.

4. A process according to claim 3 wherein said olefin-acrylic ester copolymer comprises a copolymer having 2 to 8 carbon atoms in the olefin portion of the copolymer, and an ester of acrylic or methacrylic acid with the ester of an alcohol having 1 to 18 carbon atoms in the acrylic ester portion of said copolymer.

5. A process according to claim 4 wherein said copolymer comprises a copolymer which is the reaction product of an acrylic ester selected from the group consisting of ethyl acrylate and methyl methacrylate and an olefin monomer selected from the group consisting of ethene and propene.

6. In a process for the preparation of a polymer of a vinyl halide by bulk polymerization of a vinyl halide monomer, the improvement which comprises carrying out said polymerization in the presence of about 4 to about 20 percent by weight of a trunk polymer consisting essentially of an aliphatic olefin-acrylic ester copolymer based upon the weight of said monomer, whereby impact strength and processability of the polymer obtained is improved and whereby said polymer has a graft copolymer disperse phase of about 0.1 to about 0.5 micron particle diameter.

7. The product of the process of claim 6.

8. A process according the claim 6 wherein said olefin-acrylic ester copolymer comprises a copolymer having 2 to 8 carbon atoms in the monomeric units of the olefin portion of the copolymer, and an ester of acrylic or methacrylic acid with an alcohol having 1 to 18 carbon atoms in the acrylic ester portion of the copolymer.

9. A process according to claim 6 comprising a bulk polymerization process in two-stages wherein a first stage reaction mixture is subjected to high speed agitation until about 3 percent to about 15 percent by weight of said reaction mixture has been converted to polymer and wherein the resultant reaction mixture is subjected to low speed agitation in second stage.

10. The product of the process of claim 9.

11. The process of claim 1 wherein said olefinic-acrylic ester copolymer is an ethylene-ethylacrylate copolymer.

12. The process of claim 11 wherein said ethylene-ethylacrylate copolymer has an ethylene/ethylacrylate ratio of 82/18.

13. In a process for the preparation of a polymer of a vinyl halide by bulk polymerization of a vinyl halide monomer, the improvement which comprises carrying out said polymerization in the presence of about 0.1 to about 20 percent by weight of a trunk polymer consisting essentially of an aliphatic olefin-acrylic ester copolymer based upon the weight of said monomer, whereby said polymer has a graft copolymer disperse phase of about 0.1 to about 0.5 micron particle diameter.

* * * * *